United States Patent [19]
Kanatani et al.

[11] Patent Number: 6,038,202
[45] Date of Patent: Mar. 14, 2000

[54] ELECTRONIC EQUIPMENT

[75] Inventors: Masakazu Kanatani, Tokyo; Tadami Nakamura, Saitama; Kazuhito Kurita, Kanagawa, all of Japan

[73] Assignee: Sony Corporation, Tokyo, Japan

[21] Appl. No.: 09/010,315

[22] Filed: Jan. 21, 1998

[30] Foreign Application Priority Data

Jan. 24, 1997 [JP] Japan .................... P09-011394

[51] Int. Cl.$^7$ ............................... G11B 33/02
[52] U.S. Cl. ................................ 369/77.2
[58] Field of Search ................ 369/77.2, 292; 360/71, 86, 133

[56] References Cited

U.S. PATENT DOCUMENTS

| | | | |
|---|---|---|---|
| 4,454,599 | 6/1984 | Tsuchiya | 369/77.2 |
| 4,481,617 | 11/1984 | Mabry | 369/77.2 |
| 4,673,994 | 6/1987 | Hida | 360/85 |
| 5,105,317 | 4/1992 | Sugiyama et al. | 360/71 |
| 5,668,793 | 9/1997 | Ogawa et al. | 369/77.2 |
| 5,748,595 | 5/1998 | Nakajima | 369/77.2 |
| 5,787,063 | 7/1998 | Kanno et al. | 369/77.2 |
| 5,880,907 | 3/1999 | Uwabo et al. | 360/99.06 |

*Primary Examiner*—David L. Ometz
*Assistant Examiner*—Angel Castro
*Attorney, Agent, or Firm*—Limbach & Limbach L.L.P.

[57] ABSTRACT

A recording and/or reproducing apparatus for a recording medium such as a magneto-optical disk or the like includes an apparatus body and a lid body. An apparatus body has an opening portion used for insertion and/or ejection of a recording medium. The apparatus body having a recording and/or reproducing unit for recording or reproducing a recording medium inserted through the opening portion. The lid body opens and closes the opening portion. The lid body is rotatably provided on the apparatus body. The lid body has on its side surface an inclined portion used for rotating the lid body in a direction in which the recording medium opens the opening portion when the storage medium is inserted into the apparatus body.

26 Claims, 16 Drawing Sheets

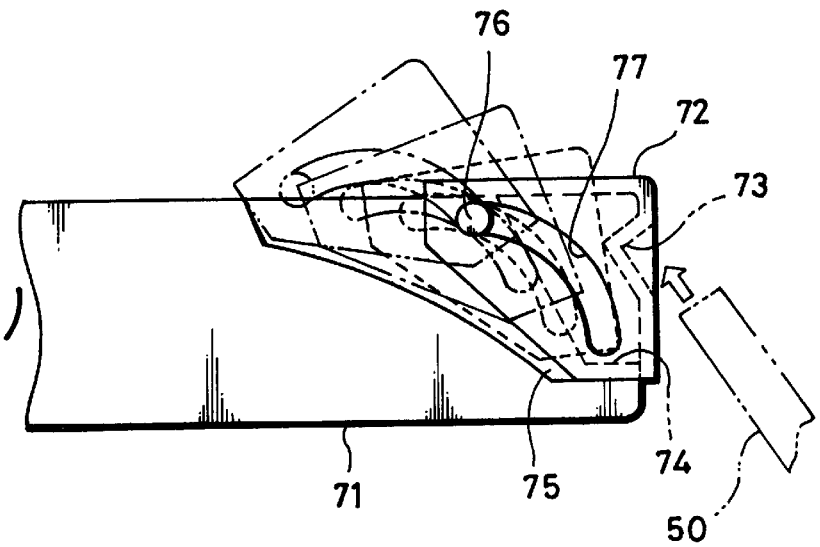
F I G. 16(A)
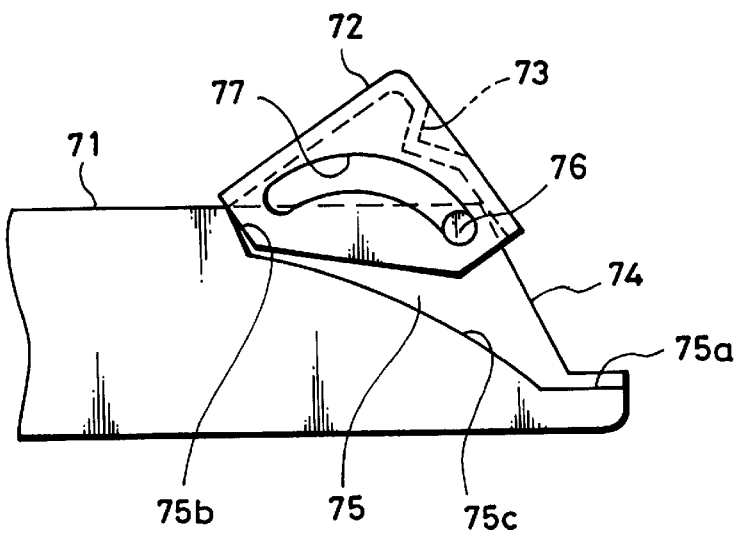
F I G. 16(B)

ELECTRONIC EQUIPMENT

BACKGROUND

1. Field of the Invention

The present invention relates to an electronic equipment employing a storage medium, a recording medium recording and/or reproducing apparatus, and a recording and/or reproducing apparatus employing a disk cartridge. Particularly, the present invention relates to an electronic equipment employing a storage medium having a lid body, a recording medium recording and/or reproducing apparatus, and a recording and/or reproducing apparatus employing a disk cartridge.

2. Background of the Invention

Generally, an electronic equipment shown in FIG. 1 has been known as that using a disk cartridge housing a disk-like recording medium as a storage medium. The electronic equipment shown in FIG. 1 is a disk recording and/or reproducing apparatus and has a substantially rectangular box-shaped casing 1 and a front panel 2 fitted to a front side of the casing 1. This front panel 2 closes a front surface opening portion of the casing 1.

The front panel 2 has a storage medium insertion portion 3 formed therethrough and formed of a slot-shaped rectangular opening portion. The disk cartridge is inserted into and ejected from the outside of the equipment through the storage medium insertion portion 3. The storage medium insertion portion 3 of the front panel 2 can be opened and closed by a lid body 5 disposed on the inner side thereof.

The lid body 5 has a shutter portion 5a which can close the whole storage medium insertion portion 3 and a pair of left and right rotation shaft portions 5b projectingly provided at upper portions of both longitudinal-direction sides of the shutter portion 5a. Both of the rotation shaft portions 5b are rotatably engaged with shaft holes provided in the front panel 2 and are biased by coil springs (not shown) toward in the direction in which the storage medium insertion portion 3.

The storage medium insertion portion 3 of the front panel 2 is usually closed by a lid body 5 by a spring force of a coil spring. When the lid body 5 is pushed backward by the disk cartridge 4 against the spring force of the coil spring and then rotated backward by about 90° with the rotation shaft portion 5b being employed as a rotation center, the storage medium insertion portion 3 is completely opened, thereby an insertion path of the disk cartridge 4 being established.

However, in the disk recording and/or reproducing apparatus as described above, the lid body 5 closing the storage medium insertion portion 3 serves as a shutter rotated inward in the casing 1 and is rotated inward by the disk cartridge 4 when the disk cartridge 4 is inserted, thereby a path where the disk cartridge 4 is loaded onto the equipment being established.

Accordingly, when the disk cartridge 4 is inserted and reaches a predetermined position in the electronic equipment, the lid body 5 is kept in a state such that it is lifted up, which permits a mechanism, parts and so on housed in the casing 1 to be exposed. Therefore, in this state, dusts and so on may enter the casing 1 from the opened storage medium insertion portion 3, which may cause any problems. Although the inside of the storage medium insertion portion 3 is usually closed by the lid body 5, the storage medium insertion portion 3 itself is always exposed, which lowers a degree of freedom in design and tends to unify an appearance of the equipment.

SUMMARY OF THE INVENTION

In view of such aspects, it is therefore an object of the present invention to provide an electronic equipment using a storage medium which resolves the above-mentioned problems.

It is another object of the present invention to provide a recording medium recording and/or reproducing apparatus which resolves the above-mentioned problems.

It is a further object of the present invention to provide a recording and/or reproducing apparatus using a disk cartridge which resolves the above-mentioned problems.

According to a first aspect of the present invention, an electronic equipment using a storage medium includes a main body and a lid body. A main body has on its front surface side an opening portion used for insertion and/or ejection of a storage medium. A lid body is rotatably provided on the main body. The lid body opens and closes the opening portion. The lid body has an inclined portion used for rotating the lid body in a direction in which the storage medium opens the opening portion when the storage medium is inserted into the electronic equipment.

According to a second aspect of the present invention, a recording medium recording and/or reproducing apparatus includes an apparatus body and a lid body. An apparatus body has an opening portion used for insertion and/or ejection of a recording medium. The apparatus body has a recording and/or reproducing unit for recording or reproducing a recording medium inserted through the opening portion. The lid body opens and closes the opening portion. The lid body is rotatably provided on the apparatus body. The lid body has on its side surface an inclined portion used for rotating the lid body in a direction in which the recording medium opens the opening portion when the storage medium is inserted into the apparatus body.

According to a third aspect of the present invention, a recording and/or reproducing apparatus using a disk cartridge includes a main body and a lid body. The main body is formed so as to have a shape of a substantially rectangular parallelepiped. The main body has an opening used for insertion and/or ejection of a disk cartridge by diagonally notching one of four corners thereof. The main body has on a lower end edge of the opening portion a first inclined surface portion inclined upward from a lower side of the opening portion thereof and also has at its side edge of the opening portion a first portion linearly extended upward from a lower side of the opening portion and an arc-shaped second portion formed continuously from the first portion. The lid body is rotatably provided on the main body. The lid body has a first surface portion forming a substantially same plane as an upper surface of the apparatus body when the opening portion is closed, and a second surface portion provided substantially perpendicular to the first surface portion and forming a substantially same surface as a side surface of the main body. The lid body has a second inclined surface which forms a substantial V-shaped concave portion together with the first inclined surface, which is provided at a portion, in contact with a lower end edge of the opening portion, of the second surface portion, and which is operated by the disk cartridge inserted into the apparatus to rotate the lid body in cooperation with the inclined surface in the direction in which the opening portion is opened.

According to a fourth aspect of the present invention, a recording and/or reproducing apparatus using a disk cartridge includes a main body and a lid body. The main body is formed so as to have a shape of a substantially rectangular parallelepiped. The main body has an opening used for insertion and/or ejection of a disk cartridge by diagonally notching one of four corners thereof and has a rotation restriction portion formed on a side edge of the opening portion thereof. The lid body is provided on the main body so that it can be moved and rotated by a disk cartridge to be inserted. The lid body having a first surface portion forming a substantially same plane as an upper surface of the apparatus body when the opening portion is closed, and a second surface portion provided substantially perpendicular to the first surface portion and forming a substantially same surface as a side surface of the main body. The second inclined surface has a concave portion having a substantially V-shaped cross section which is operated by a disk cartridge to be inserted into the apparatus and which serves to rotate the lid body in a direction in which the opening portion is opened.

BRIEF DESCRIPTION OF THE DRAWINGS

FIGS. 8(A) to 8(C) are diagrams showing an operation of opening and closing the lid body of the disk reproducing apparatus shown in FIG. 2, wherein FIG. 8(A) is a diagram used to explain a state before the lid body is opened, FIG. 8(B) a diagram used to explain an initial state that the lid body is being opened, and FIG. 8(C) a diagram used to explain a state that the lid body is completely opened;

FIGS. 9(A) and 9(B) are diagrams showing an operation of opening and closing the lid body of the disk reproducing apparatus shown in FIG. 2, wherein FIG. 9(A) is a diagram used to explain a state before the loading mechanism is lifted and FIG. 9(B) a diagram used to explain a state that the loading mechanism is lowered;

FIGS. 16(A) and 16(B) are an operation of opening and closing a lid body of the disk reproducing apparatus shown in FIG. 15, wherein FIG. 16(A) is a diagram used to explain a series of movement states of the lid body and FIG. 16(B) is a diagram used to explain that the lid body is moved to an upper end portion.

DESCRIPTION OF THE PREFERRED EMBODIMENTS

A recording medium recording and/or reproducing apparatus according to the present invention will hereinafter be described in detail with reference to the accompanying drawings. In the embodiments of the present invention described later on, the recording medium and/or reproducing apparatus will be described by describing an example of a disk reproducing apparatus employing a magneto-optical disk housed in a disk cartridge, for example.

Figure 1:
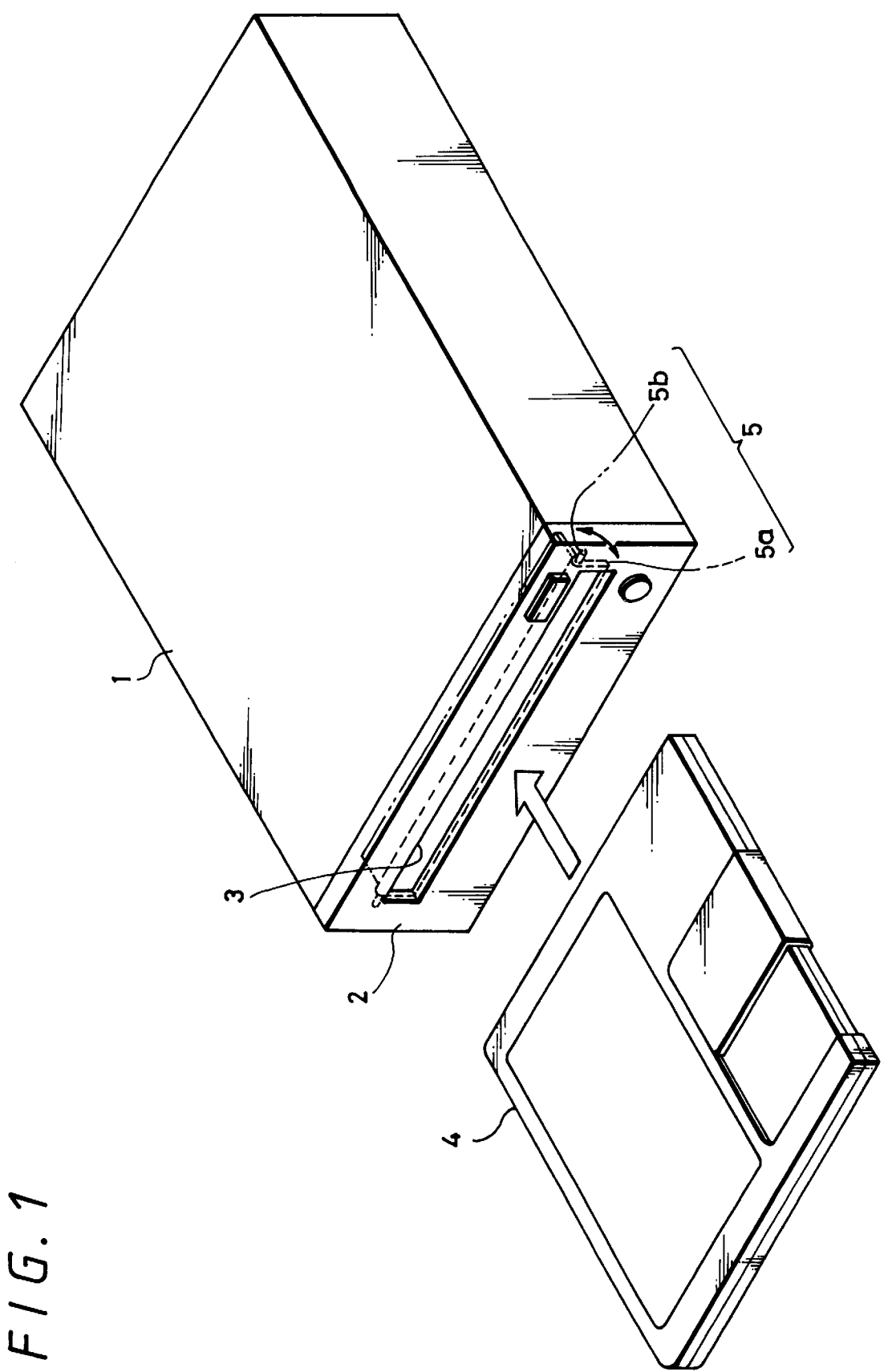
FIG. 1 is a perspective view showing an appearance of a disk storage apparatus and that of a disk cartridge used therein.
Figure 2:
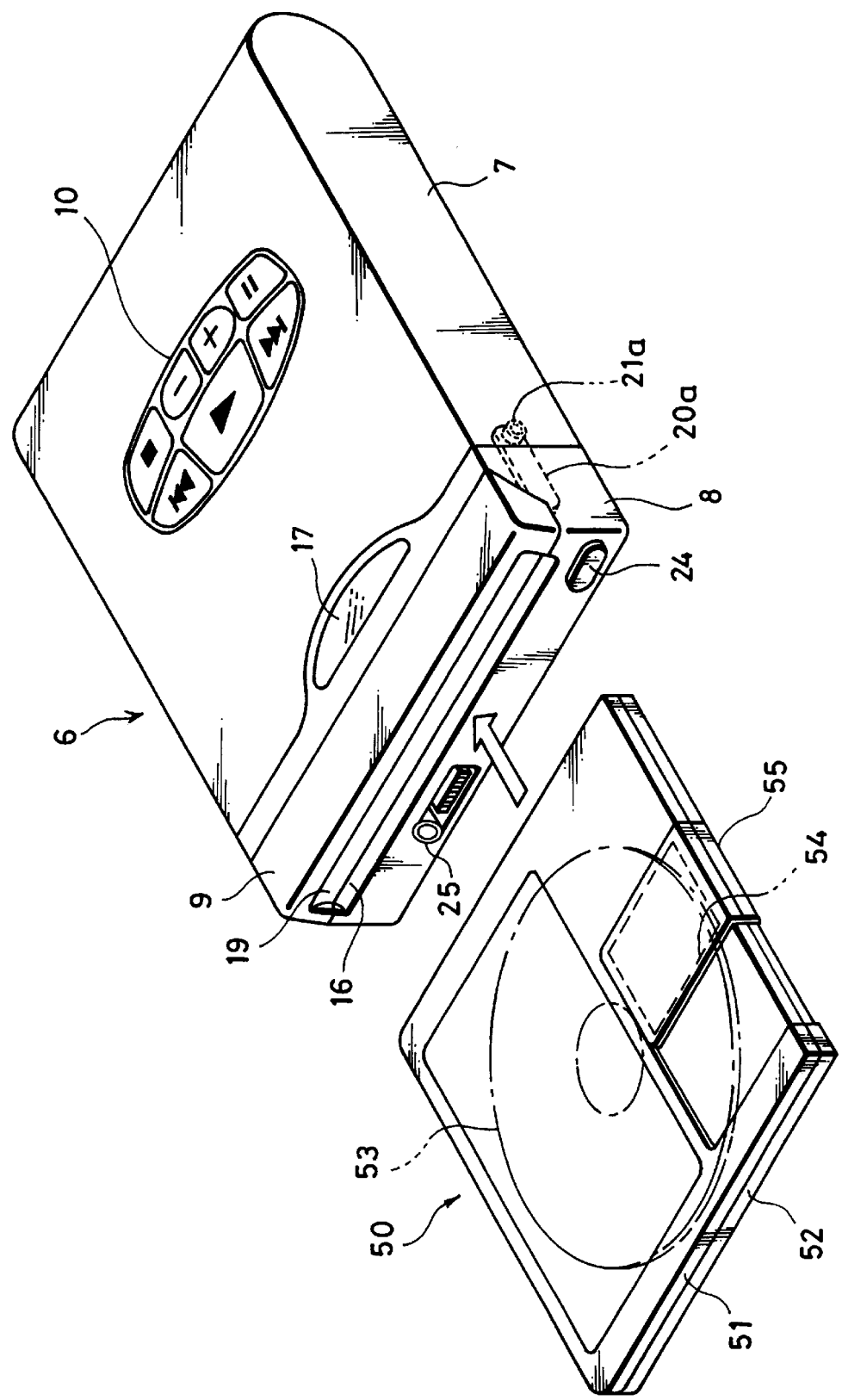
FIG. 2 is a perspective view showing an appearance of a disk reproducing apparatus according to a first embodiment of the present invention and that of a disk cartridge used therein.

A disk reproducing apparatus 6 according to a first embodiment of the present invention shown in FIGS. 2 to 14 has, as shown in FIG. 2, a casing 7, a front panel 8 and a lid body 9. The casing 7, the front panel 8 and the lid body 9 form a facing body of the disk reproducing apparatus 6. In the facing body, a disk loading mechanism, a disk rotating mechanism, an information reproducing mechanism, a shutter opening and closing mechanism, other mechanisms and apparatus, and so on are housed.

Figure 3:
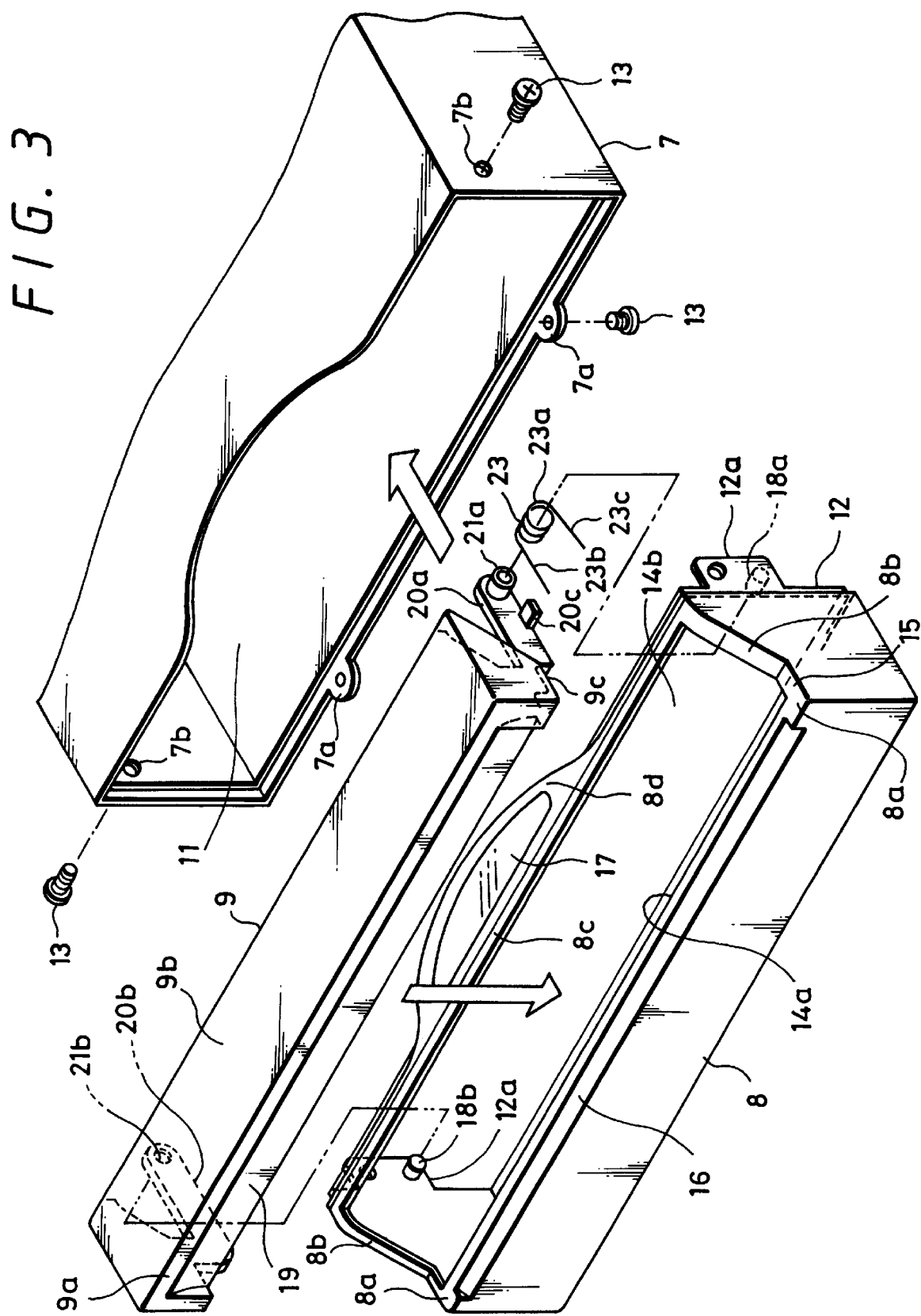
FIG. 3 is an exploded, perspective view showing main parts of a casing, a front panel and a lid body of the disk reproducing apparatus shown in FIG. 2.

As shown in FIG. 3, the casing 7 is formed so as to have an opening through its front surface and to be rectangular-shaped. In the casing 7, a chassis described later on is housed and fixed, and mounted with a disk loading mechanism, an information reproducing mechanism and so on. As shown in FIG. 2, an operation portion 10 having a playback button, a fast-forward button, a stop button, a volume control button and so on is provided on an upper surface of the casing 7. As shown in FIG. 3, a panel frame portion 12 provided at a rear portion of the front panel 8 is engaged with an opening portion 11 provided at a front surface of the casing 7. The front panel 8 is fitted to the casing 7 by a plurality of fitting screws 13.

For this end, a pair of linkage tongue pieces 7a, 7a having apertures are provided on an opening-portion side lower surface of the casing 7, and screw insertion apertures 7b, 7b are bored through side surfaces thereof. A pair of bearing pieces 12a, 12a having screw insertion apertures are provided at both side portions of the panel frame portion 12 of the front panel 8. Fitting screws 13, 13 are screwed into the screw insertion apertures of the bearing pieces 12a, 12a in a state that the panel frame portion 12 is engaged with the opening portion 11 of the casing 7, thereby the front panel 8 being fitted to the casing 7.

As shown in FIG. 3, the front panel 8 fixed on the casing 7 is formed of a rectangular housing having openings through its upper and rear surfaces. When the front panel 8 is fitted to the casing 7, the rear-surface side opening portion 14b is opposite the opening portion 11 of the casing 7, and then the opening portions 14b and 11 are continuously connected so as to form one aperture. A notch portion 15 used for the lid body 9 to overlap the same is provided at an upper corner portion of a front portion of the front panel 8. The upper-surface side opening portion 14a opened at the notch portion 15 serves as a recording medium insertion portion through which a recording medium is inserted into the disk reproducing apparatus 6. In a state that the front panel 8 is fitted to the casing 7, in view of the whole apparatus 6, the opening portion 14a can be regarded as an opening formed by diagonally notching one of four corners of the apparatus 6 having a shape of a substantially rectangular parallelepiped. Since the notch portion 15 is provided, plane receiving portions 8a, 8a brought in contact with a lower end edge of the lid body 9 and inclined-surface receiving portions 8b, 8b continuously provided on the rear side of the plane receiving portions 8a, 8a and inclined upward in the backward direction are provided on an upper portion of the front panel 8. The inclined-surface receiving portions 8b, 8b are linearly extended from their lower end portions up to the vicinity of their upper end portions and formed so as to be curved and have upward convexes at their end portions.

A panel side inclined guide portion 16 formed as a plane inclined forward is provided at a front end edge of a portion between the plane receiving portions 8a, 8a. A lateral-direction length of the inclined guide portion 16 is set substantially similar to a lateral-direction length of the opening portion 14a. When a disk cartridge 50 is inserted as will be described later, an insertion-side lower end edge of the disk cartridge 50 is brought in contact with the inclined guide portion 16 and then the inclined guide portion 16 serves to guide the disk cartridge 50 in the direction.

A rear frame portion 8c is provided on the rear side of the inclined-surface receiving portions 8b, 8b of the front panel 8 so as to be connect the left and the right inclined-surface receiving portions 8b, 8b. A projection portion 8d projected with being arc-shaped and having a transparent window 17 through which the inserted disk cartridge 50 can be seen is provided at the middle portion in the longitudinal direction of the rear frame portion 8c. Rotation shafts 18a, 18b projected inward so as to be opposed to each other with sharing the same center line are provided below the insertion apertures of the respective bearing pieces 12a, 12a of the panel frame portion 12. As shown in FIG. 2, an eject button 24 used for ejecting the inserted disk cartridge 50 and a headphone jack 25 for connecting a headphone to this electronic equipment are provided on the front surface of the front panel 8.

The lid body 9 fitted to the front panel 8 so as to be matched with the notch portion 15 of the front panel 8 has a front surface plate 9a, an upper surface plate 9b provided substantially perpendicular to the front surface plate 9a and extended backward continuously from the front surface plate 9a, and side surface plates 9c, 9c continuously formed at both of the side portions of the upper surface plate 9b. The front surface plate 9a is positioned at the substantially same plane as the front surface of the front panel 8 in a state that the opening portion 14a is closed. The upper surface plate 9b is positioned at the substantially same plane as the upper surface of the casing 7 in a state that the lid body 9 closes the opening portion 14a. A lid-body side inclined guide portion 19 formed as a curved surface slanting to the back is provided on an outer side of the front surface plate 9a of the lid body 9, i.e., on a side opposed to the disk cartridge 50 to be inserted. Depth-direction and width-direction lengths of the inclined guide portion 19 are set substantially the same as those of the panel side inclined guide portion 16. When the disk cartridge 50 is inserted, the inclined guide portion 19 is brought in contact with the insertion-side upper end edge of the disk cartridge 50 and lifted up by a pressing force of the disk cartridge 50, thereby the opening portion 14a serving as the recording medium insertion portion being opened.

As described above, as shown in FIG. 8(A), the inclined guide portion 19 of the lid body 9 and the inclined guide portion 16 of the front panel 8 serving as a casing-side member respectively have S-shaped cross sections so as to be continuous from each other in the vicinity of the boundary where both of the inclined guide portions 19, 16 are in contact with each other. When the disk cartridge 50 is inserted, the inclined guide inportion 16 and the inclined guide portion 19 cooperatively act, thereby an opening operation of the lid body 9 described later on being automatically carried out in accordance with an insertion operation of the disk cartridge 50.

Arm portions 20a, 20b projected downward are provided at both lower-surface side portions of the upper surface plate 9b of the lid body 9. The arm portions 20a, 20b are biased inward so as to avoid the inclined-surface receiving portions 8b, 8b of the front panel 8 and bent backward from their middle portions. The one arm portion 20a has a cylindrical shaft portion 21a at its tip end portion, and the other arm portion 20b has a bearing aperture 21b at its tip end portion.

Of the cylindrical portion 21a and the bearing aperture 21b, the one rotation shaft 18a of the front panel 8 is rotatably engaged with a hole of the cylindrical portion 21a, and the other rotation shaft 18b of the front panel 8 is rotatably engaged with the bearing aperture 21b. Rotation portions of these cylindrical shaft portion 21a and the bearing aperture 21b are employed as a rotation center of the lid body 9. A lid-body moving mechanism is formed of a pair of the arm portions 20a, 20b, the cylindrical shaft portion 21a and the bearing aperture 21b respectively provided thereat, and a pair of the rotation shafts 18a, 18b provided on the front panel 8. The lid-body moving mechanism moves the lid body 9 in the direction in which the lid body 9 is opened outward relative to the casing 7, by rotating the lid body 9 with employing the rotation shafts 18a, 18b pivotally supported by the cylindrical shaft portion 21a and the bearing aperture 21b, respectively.

Figure 4:
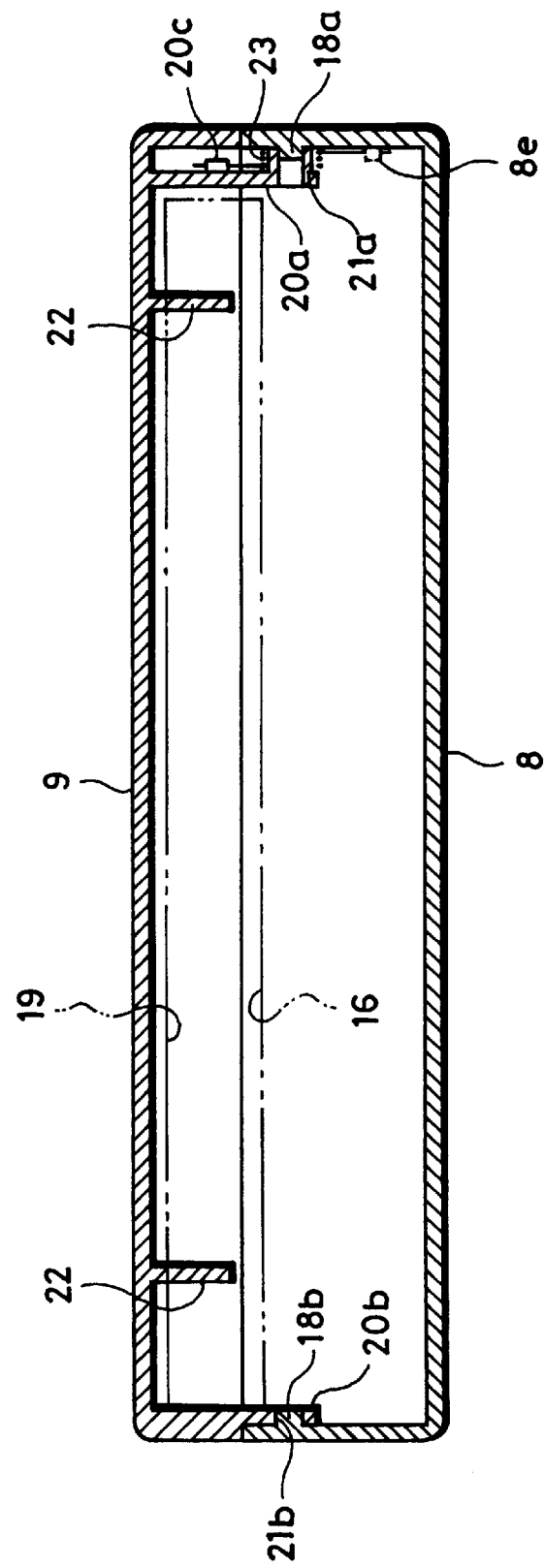
FIG. 4 is a cross-sectional view showing the front panel and the lid body of the disk reproducing apparatus shown in FIG. 2.
Figure 5:
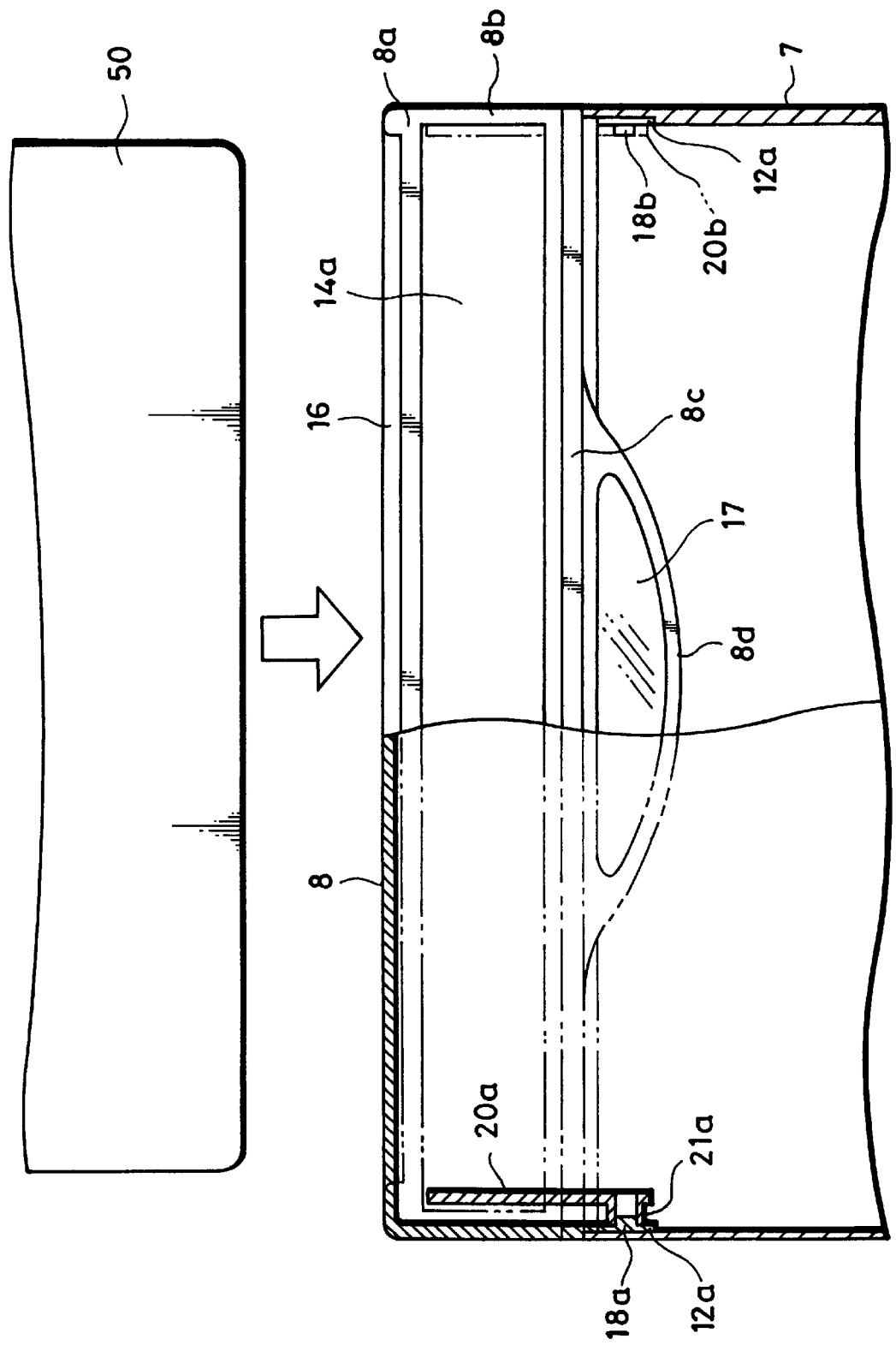
FIG. 5 is a cross-sectional view of the casing, the front panel and the lid body of the disk reproducing apparatus shown in FIG. 2.

As shown in FIG. 4, ribs 22, 22 for lifting the lid body 9 up are provided between both of the arm portions 20a, 20b. When the disk cartridge 50 is inserted, the ribs 22, 22 are brought onto the upper surface of the inserted disk cartridge 50 and then serve to reduce the friction of the lid body 9 resulting from its sliding on the disk cartridge 50 to thereby permit the lid body 9 to easily rotate. Accordingly, when the disk cartridge 50 is inserted and ejected, only tip end portions of the ribs 22, 22 are brought in contact with the disk cartridge 50.

As shown in FIG. 3, a torsion spring 23 for biasing the lid body 9 toward the front panel 8 is fitted between the lid body 9 and the front panel 8. The torsion spring 23 has a coil portion 23a at its center portion and two spring pieces 23b, 23c projected from both ends of the coil portion 23a. The cylindrical shaft portion 21a at the tip end of the arm portion 20a of the lid body 9 is inserted into the coil portion 23a of the torsion spring 23. The one spring piece 23b is engaged with and stopped at a spring receiving piece 20c of the arm portion 20a, and the other spring piece 23c is engaged with and stopped at a spring receiving piece 8e provided on an inner surface of the front panel 8. Thus, the lid body 9 is biased toward the front panel 8 side, i.e., in the direction in which the opening portion 14a is closed.

Figure 8A:
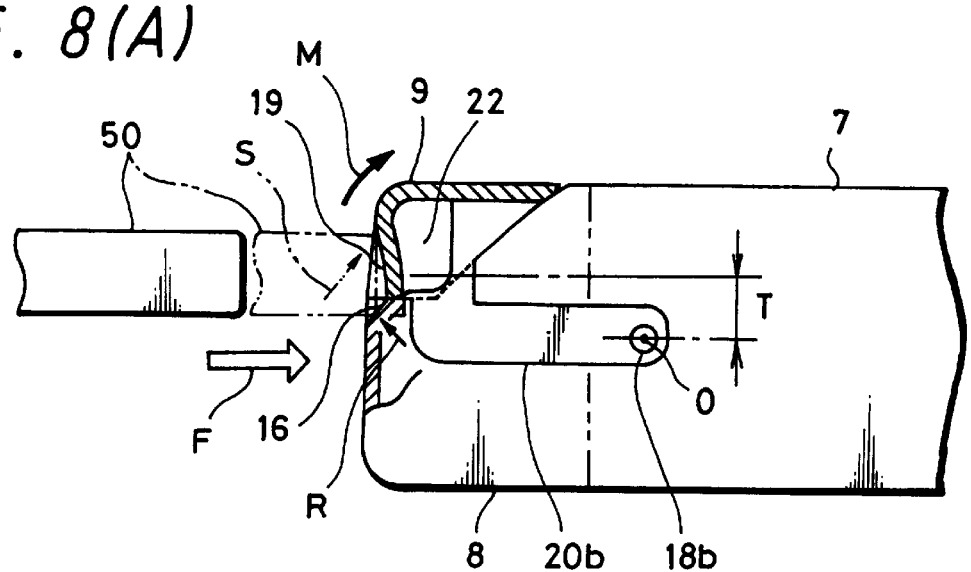

In a state that the front panel 8 is fitted to the lid body 9, a spring force of the torsion spring 23 keeps the lid body 9 biased toward the front panel 8. At this time, as shown in FIG. 8(A), lower end portions of the front surface plate 9a and the both side surface plates 9c of the lid body 9 are brought in contact with the plane receiving portion 8a and the inclined-surface receiving portions 8b, 8b of the front panel 8 from the upper side. Since the lid body 9 is positioned at one of the four corners of the casing 7, the lid body 9 and the casing 7 integrally form the facing body. Since the lid body 9 is formed so that its external shape and an external shape of the casing 7 should be continuous, thereby the facing body having the whole external shape which can be regarded as that of a unit being formed.

Figure 6:
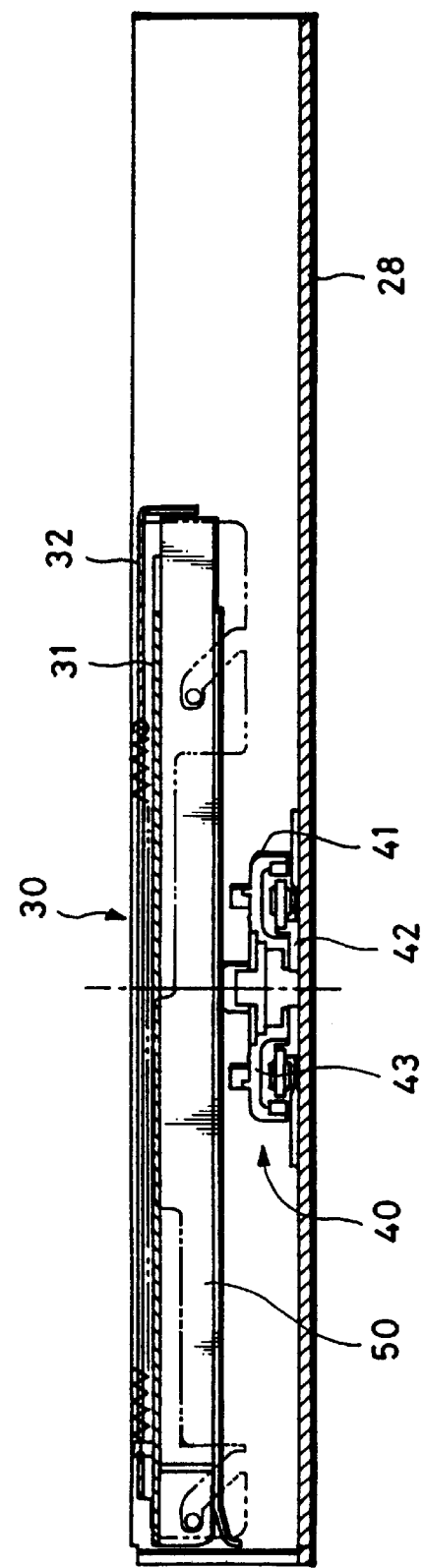
FIG. 6 is a cross-sectional view of a parallel vertical movement type loading mechanism, which is a first example of a means for taking a disk cartridge out of the disk reproducing apparatus shown in FIG. 2, in its lifted-up state.
Figure 7:
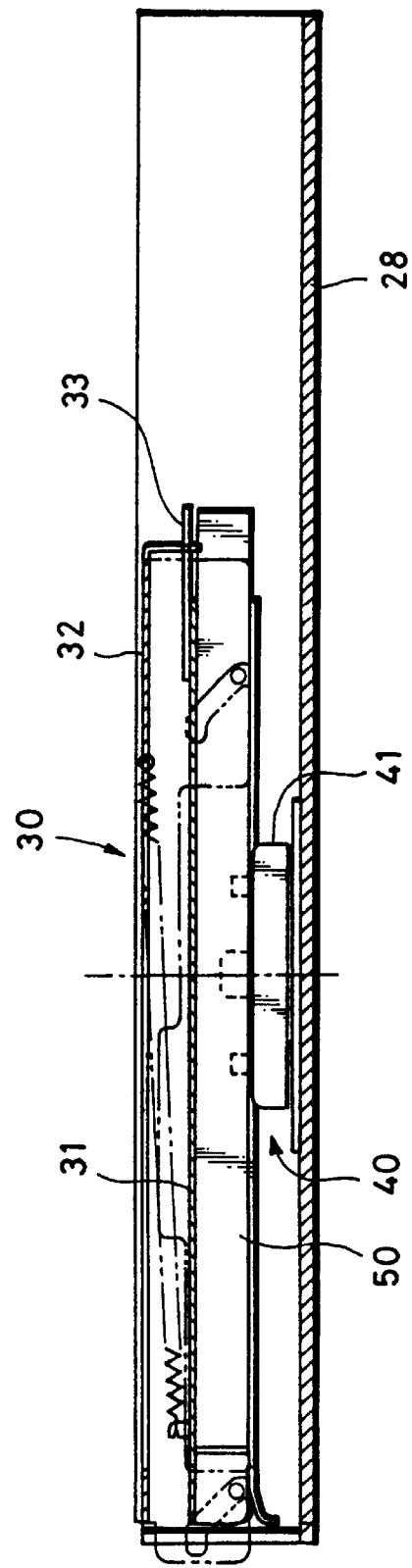
FIG. 7 is a cross-sectional view of a parallel vertical movement type loading mechanism, which is the first example of the means for taking the disk cartridge out of the disk reproducing apparatus shown in FIG. 2, in its lowered state.

The facing body having the above arrangement houses therein a disk loading mechanism 30 and a disk rotating mechanism 40 which are mounted on a chassis 28 shown in FIGS. 6 and 7. The disk loading mechanism 30 is a mechanism for lifting a cartridge holder 31 for holding the disk cartridge 50 inserted through the above recording medium insertion portion 14a up and down in the vertical direction with keeping the same in its horizontal state. When the disk loading mechanism 30 carries out its lift-down operation, a magneto-optical disk 53 as a disk-like recording medium housed in the disk cartridge 50 is loaded onto a spindle motor 41 of the disk rotating mechanism 40 provided below the disk loading mechanism 30.

As shown in FIGS. 6 and 7, the disk loading mechanism 30 has the cartridge holder 31 supported by the chassis 28 so as to be lifted up and down in the vertical direction, a slide member 32 supported by the chassis 28 so as to be movable in the forward and backward direction, and a holder locking member 33 for locking the cartridge holder 31 upon the loading operation. The chassis 28 is formed of a flat casing having a laterally-inclined-U-shaped cross section with openings at its upper, front and rear surfaces, and a front surface thereof is opposed to the front panel 8. The sliding member 32 is provided so as to be movable linearly in the forward and backward direction relative to the chassis 28.

The cartridge holder 31 and the sliding member 32 can be relatively moved by a holder lifting and lowering mechanism in the directions perpendicular to each other, respectively. The holder lifting and lowering mechanism is formed of a lifting and lowering mechanism for restricting the horizontal direction movement of the cartridge holder 31 to thereby lift the cartridge holder 31 up and down only in the vertical direction, a horizontal movement mechanism for restricting the vertical-direction movement of the sliding member 32 to thereby move the sliding member 32 only in the horizontal direction, and a direction changing mechanism for converting the horizontal-direction movement of the sliding member 32 into the lifting and lowering of the cartridge holder 31.

The disk rotating mechanism 40 provided below the disk loading mechanism 30 has a turntable 43 for magnetically chucking the magneto-optical disk 53 and the spindle motor 41 fitted with the turntable 43 at a tip end of its rotation shaft. The spindle motor 41 is mounted on the chassis 28 at the center of its front side with its rotation shaft being faced upward, and also fixed on the chassis 28 by a plurality of fitting screws pierced through flange portions of a fixing member 42 provided on a lower side of the spindle motor 41. A ring-shaped magnet, not shown, is provided at the center of the turntable 43, and this magnet chucks the magneto-optical disk as will be described later on.

As shown in FIG. 2, the disk cartridge 50 for use in the disk reproducing apparatus 6 has a pair of upper shell 51 and a lower shell 52, and a magneto-optical disk 53 rotatably housed in a disk chamber portion provided between the both of the shells 51, 52. A metal hub, not shown, is fitted to a center portion of the magneto-optical disk 53. A lower surface of the metal hub is opposed to an opening portion formed through a center portion of the lower shell 52. The turntable 43 of the spindle motor 41 is inserted through this opening portion, and then the ring-shaped magnet provided on the turntable 43 magnetically absorbs and chucks the magneto-optical disk 53.

As shown in FIG. 2, the upper and lower shells 51, 52 have opening portions 54, 54 provided therethrough so as to be extended outward from the center of the magneto-optical disk 53. In FIG. 2, the opening portion 54 formed through the lower shell 51 is not shown in FIG. 2 in order to avoid complication of the figure. The magnetic head of the recording and/or reproducing mechanism is inserted into the opening portion 54 of the upper shell 51, and an optical head of the recording and/or reproducing mechanism is opposed to the opening portion 54 of the lower shell 52. These opening portions 54, 54 can be opened and closed by a shutter 55. The shutter 55 of the disk cartridge 50 is opened by a shutter opening and closing mechanism (not shown) provided in the cartridge holder 31, and in a state that the shutter 55 is opened, the magnetic head or the optical head is opposed to the magneto-optical disk 53. When the disk cartridge 50 is ejected from the disk reproducing apparatus 6, the shutter opening and closing mechanism moves the disk cartridge 50 to a position where the shutter 55 thereof closes the opening portions 54, 54.

An opening and closing operation of the lid body 9 in the disk reproducing apparatus 6 having the above arrangement will be described. As shown in FIG. 2, an insertion-side end of the disk cartridge 50 is positioned so as to be opposed to the recording-medium insertion portion of the disk reproducing apparatus 6. The disk cartridge 50 is moved toward the lid body 9 while being positioned substantially in parallel to the upper and lower surfaces of the casing 7, and as shown in FIG. 8(A), an insertion-side lower end edge of the disk cartridge 50 is brought in contact with the guide included portion 16 of the front panel 8. At this time, an insertion-side upper end edge of the disk cartridge 50 may be brought in contact with the inclined guide portion 19 of the lid 9.

When from this state a force F is applied to the disk cartridge 50 and thereby the disk cartridge 50 presses the front panel 11, a counterforce R the front panel 8 is linked with and fixed on the casing 7. Since, as shown in FIG. 8(A), the inclined guide portion 16 is formed as a plane inclined upward in the depth direction, a diagonally upward force S toward the lid body 9 located above the disk cartridge 9 is applied to the disk cartridge 50 in response to balance of forces applied to a contact point of the inclined guide portion 16 and the disk cartridge 50.

Figure 8B:
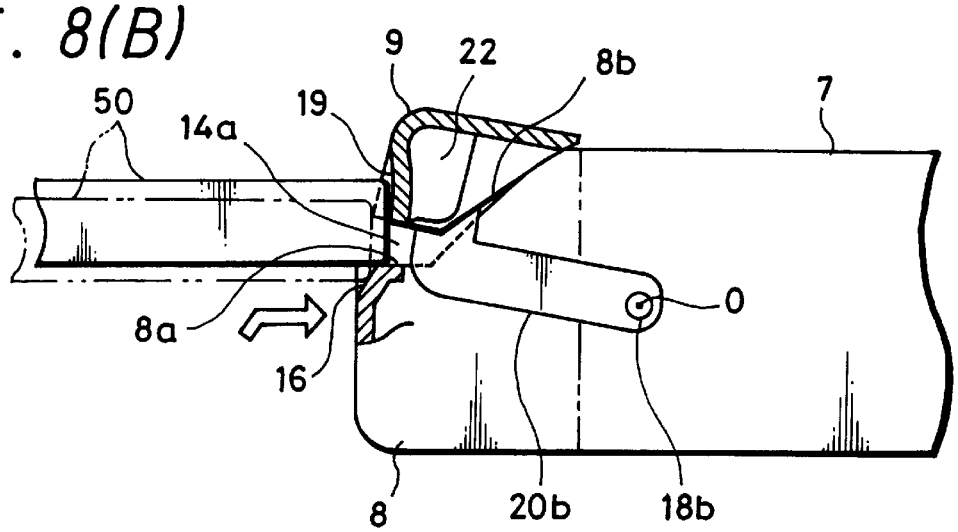

Since the lid body 9 is rotatably and pivotally supported on the casing 7 side by the lid-body moving mechanism and the rotation shafts 18a, 18b serving as rotation fulcrums therefor are located below a movement locus of the disk cartridge 50 by a length T. A clockwise-direction rotation moment M is produced in the lid 9 as shown in FIG. 8(A). At this time, since the lid body 9 is constantly biased toward the front panel 8 by the torsion spring 23, while a moment which rotates the lid body 9 by a spring force of the torsion spring 23 is larger than the rotation moment M, the lid body 9 is not moved. However, if the rotation moment M becomes larger than the moment resulting from the torsion spring 23, as shown in FIG. 8(B), the lid body 9 is rotated in the clockwise direction with the rotation shafts 18a, 18b being employed as the rotation center O.

At this time, since the inclined guide portion 19 of the lid body 9 brought in contact with the insertion-side upper end edge of the disk cartridge 50 is formed as an arc-shaped, curved surface having a large concave in the depth direction on its lower side, it is possible to secure a rotation of the lid body 9 in response to a horizontal-direction movement of the disk cartridge 50. Since the rotation center O of the lid body 9 is positioned on the inner side of the casing 7, a distance between the rotation center O and the inclined-surface receiving portion 8b provided at the upper portion of the front panel 8 becomes the shorte st at the middle portion of the inclined-surface receiving portion 8b. Therefore, if the inclined-surface receiving portion 8b is linearly extended from its lower end to its upper end, then it becomes impossible for the lid body 9 to be rotated at the upper portion with respect to the portion where the above distance becomes the shortest, because the extended portion on the upper side of the inclined-surface receiving portion 8b interferes with the rotation of the lid body 9. According to the first embodiment, since, as shown in FIGS. 8(A) to 8(C), the upper side portion, with respect to the position where the above distance becomes the shortest, of the inclined-surface receiving portion 8b is formed so as to be arc-shaped and the above distance is set equal to or shorter than the shortest distance, it is also possible to secure the rotation of the lid body 9 in view of this arrangement.

Figure 8C:
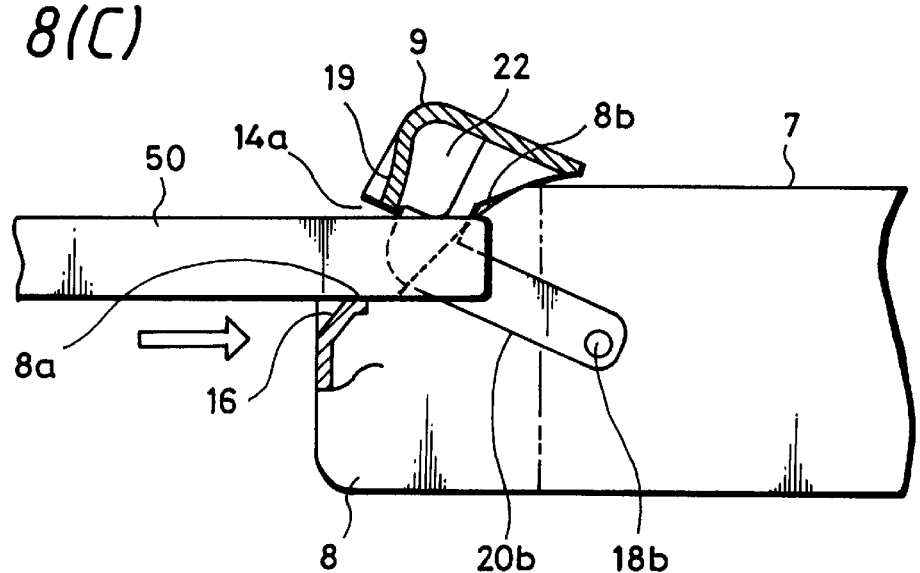

When the above-mentioned actions of the upper and lower inclined guide portions 19, 16 and the disk cartridge 50 move the lid body 9 in the direction in which the casing 7 is opened toward the outside and then the insertion-side tip end portion of the disk cartridge 50 is brought into the opened opening portion 14a as the recording medium insertion portion, as shown in FIG. 8(C), the lid body 9 is brought onto the disk cartridge 50. Then, since there is no bar to prevent the disk cartridge from entering the disk reproducing apparatus 6 ahead of the disk cartridge 50 in its movement locus direction, the disk cartridge 50 can be inserted into the disk reproducing apparatus 6.

At this time, while the disk cartridge 50 is inserted while being guided by the plane receiving portion 8a while being sandwiched by the front panel 8 and the lid body 9, only the lower end portions of the ribs 22, 22 provided at the lid body 9 are slidably in contact with the upper surface of the disk cartridge 50 and hence the frictional drag caused by the ribs 22, 22 is not very large. Although the biasing force of the torsion spring 23 is still applied from the lid body 9 to the disk cartridge 50, the disk cartridge 50 can be easily inserted.

Figure 9A:
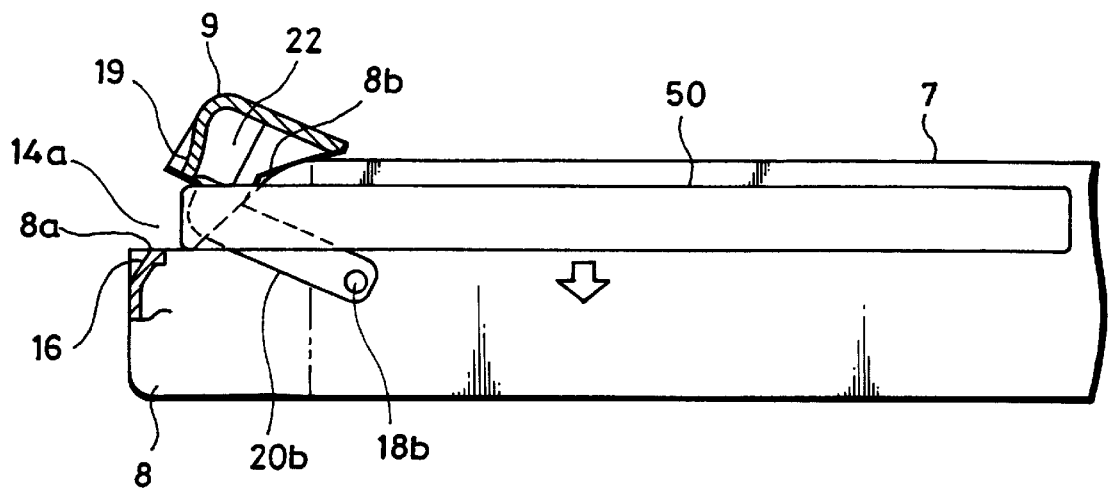

Since the cartridge holder 31 supported by the chassis 25 is positioned on the movement locus of the disk cartridge 50 and an insertion opening of the cartridge holder 31 is provided in the vicinity of the inner side of the lid body 9, when the disk cartridge 50 passes by the lid body 9, its insertion side enters the cartridge holder 31. As shown in FIG. 9(A), when the disk cartridge 50 is completely inserted into the casing 7 side, the disk cartridge 50 is completely brought into the cartridge holder 31, and then the cartridge holder 31 is brought in a state shown in FIG. 6. At this time, the shutter 55 of the disk cartridge 50 is opened by an operation of the shutter opening and closing mechanism. The lid body 9 is brought onto the disk cartridge 50 and the opening portion 14a is brought in its opened state.

When the disk cartridge 50 is brought to a predetermined position of the cartridge holder 31, the disk loading mechanism 30 operates to lower the cartridge holder 31 vertically. As shown in FIG. 7, the disk cartridge 50 held in the cartridge holder 31 is brought close to the spindle motor 41 of the disk rotating mechanism 40 and then the magneto-optical disk 53 is chucked on the turntable 43. At this time, the magnetic head or the optical head is opposed to the magneto-optical disk 53 through one of the opening portions 54, 54 of the disk cartridge 50 whose shutter 55 is opened, and thus the magneto-optical disk 53 can be recorded and reproduced.

Figure 9B:
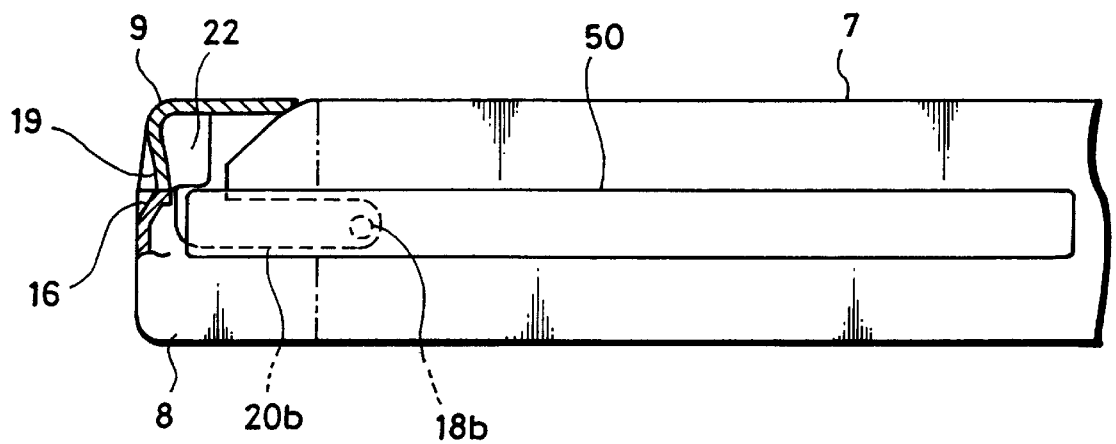

In this case, when the disk cartridge 50 is lowered to the predetermined position and then the magneto-optical disk 53 is chucked by the turntable 43, a force applied from the disk cartridge 50 to the lid body 9 for lifting the lid body 9 up is released and hence the spring force of the torsion spring 23 serves to rotate the lid body 9 toward the front panel 8. As shown in FIG. 9(B), consequently, the lower surface of the front surface plate 9a of the lid body 9 is brought in contact with the plane receiving portion 8a of the front panel 8, and each of the lower surfaces of the side surface plates 9c, 9c is brought in contact with the plane receiving portion 8a and the inclined-surface receiving portion 8b. The lid body 9 and the front panel 8a are brought in entire contact with each other, thereby the opening portion 14a being completely closed.

Since, as shown in FIG. 9(B), the opening portion 14a as the recording medium insertion portion 14a is closed in a state that the disk cartridge 50 is completely inserted, the dust and so on are prevented from intruding into the disk reproducing apparatus 6 through the opening portion 14a. Therefore, it is possible to prevent inconvenience such as a trouble resulting from intrusion of dust and so on. Since the opening portion 14a is not exposed to the outside relative to the front panel 8 in a state that the disk cartridge 50 is inserted, degree of freedom in design of the whole apparatus is increased, which can lead to realization of a more creative (i.e., not uniform) design.

A modified example of employing a rotary type disk loading mechanism 60 as a recording medium loading mechanism will be described with reference to FIG. 11 and the succeeding figures. The disk loading mechanism 60 is a mechanism for rotating a front side of the cartridge holder for holding the disk cartridge 50 inserted through the opening portion as the recording medium insertion portion, in the vertical direction with employing a rear side thereof as a rotation center. When the front side of the cartridge holder is rotated upward and hence the cartridge holder is inclined, this disk loading mechanism 60 is brought in its unloading state. When the front side of the cartridge holder is rotated downward and hence the cartridge holder is brought into its horizontal state, this disk loading mechanism 60 is brought in its loading state. In the loading state, the magneto-optical disk 53 housed in the disk cartridge 50 is loaded onto a turntable, not shown, of the spindle motor 41 of the disk rotating mechanism 40.

Figure 10:
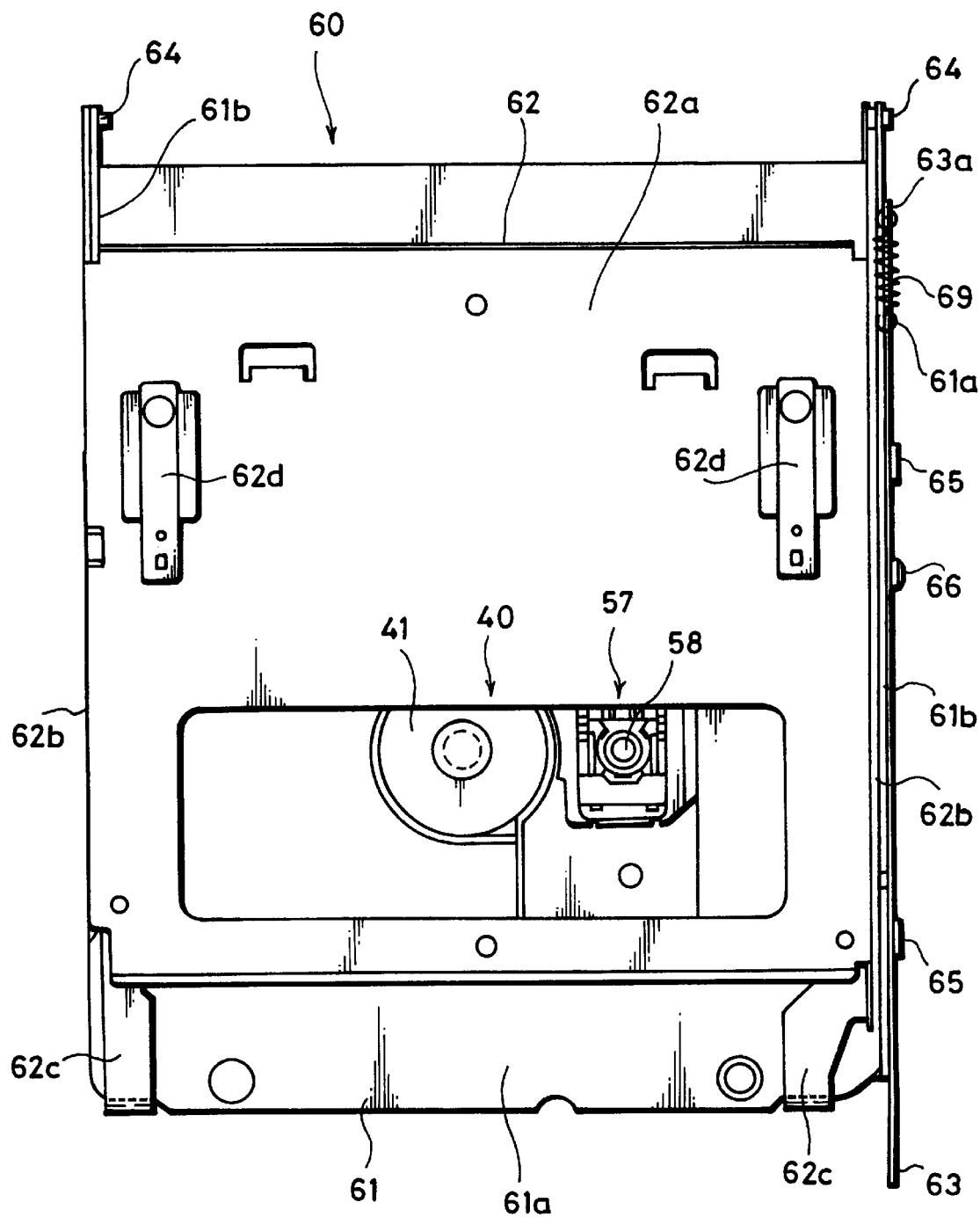
FIG. 10 is a plan view of a rotary loading mechanism which is a modified example of the loading mechanism of the disk reproducing apparatus shown in FIG. 2.
Figure 11:
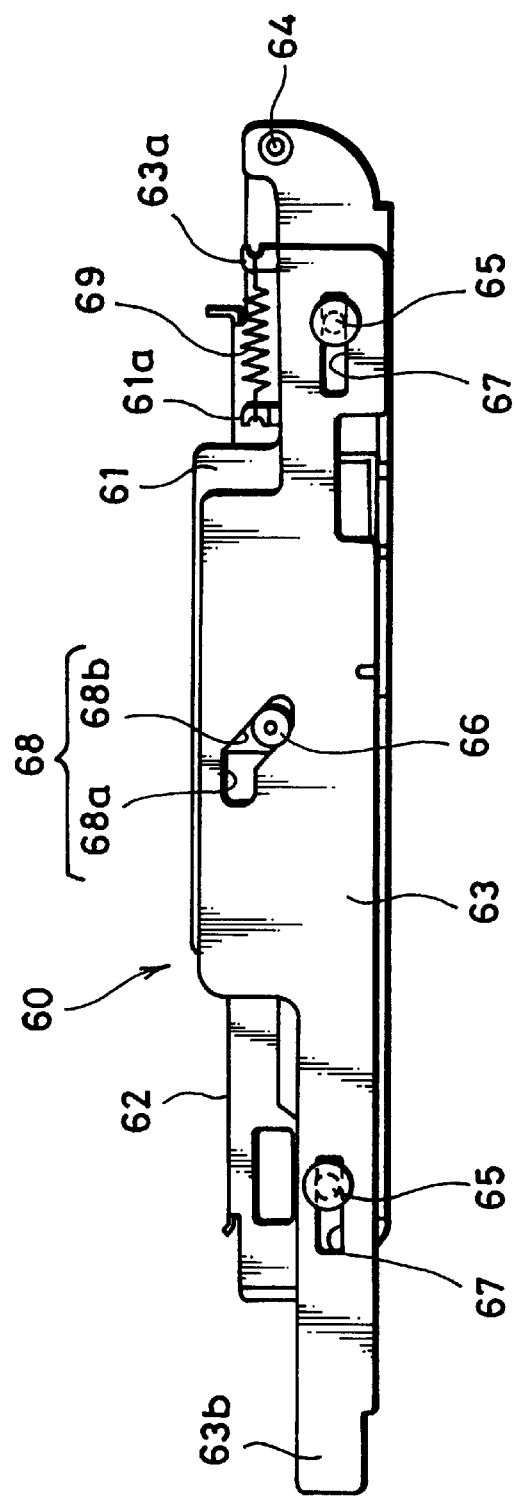
FIG. 11 is a side view of the rotary loading mechanism shown in FIG. 10.

As shown in FIGS. 10 and 11, the disk loading mechanism 60 has a chassis 61 fixed on the casing 7, a cartridge holder 62 provided on the chassis 61 so as to be ratable in the vertical direction, and an eject lever 63 supported by the chassis 61 so as to be slidable in the forward and backward direction.

The chassis 61 has a shallow gutter having a rectangular cross section and formed of a lower surface plate 61a having a plane slightly larger than the disk cartridge 50, and left and right side surface plates 61b, 61b formed so as to be erected upward on the both lateral-direction sides of the lower surface plate 61a. The spindle motor 41 of the disk rotating mechanism 40 is fixed on a front-side center portion of the lower surface plate 61a of the chassis 61. An optical head 58 of an information reproducing mechanism 57 is disposed on one side of the spindle motor 41 so as to be movable in the radius direction of the magneto-optical disk 53.

Figure 12:
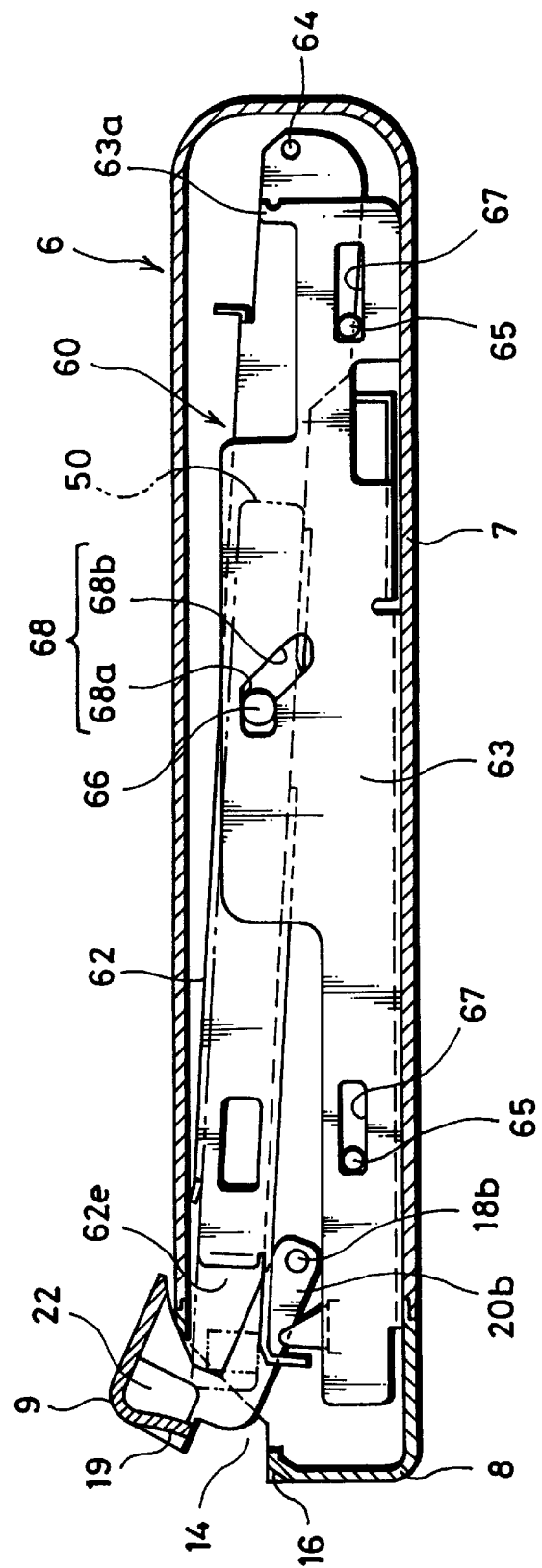
FIG. 12 is a diagram showing the rotation operation of the rotary loading mechanism shown in FIG. 10 and used to explain a state that an inclined angle of a cartridge holder is set small.

The cartridge holder 62 has an upper surface plate 62a covering an upper surface of the chassis 61, left and right side surface plates 62b, 62b formed on both lateral-direction sides of the upper surface plate 62a so as to be erected downward, and holding plates 62c, 62c continuously formed on lower portions of the side surface plats 62b, 62b by bending the lower portions of the side surface plates 62b, 62b inward by proper widths. A space surrounded by the chassis 61 and the cartridge holder 62 forms a disk cartridge loading portion, and a cartridge insertion portion 62e is provided on one side of this space as shown in FIG. 12. Pressing springs 62d, 62d are fitted to rear-side both side portions of the upper surface plate 62a of the cartridge holder 62 so as to correspond to the holding plates 62c, 62c. The pressing springs 62d, 62d serve to bias the inserted disk cartridge 50 toward the holding plates 62c, 62c to thereby position the disk cartridge 50 in the height direction thereof.

The cartridge holder 62 and the chassis 61 are rotatably linked by pivots 64, 64 at both left and right rear end portions. The cartridge holder 62 is rotated in the vertical direction with the pivots 64, 64 being employed as a rotation center. Guide pins 65, 65 projected to sides are provided on forward-and-backward-direction front and rear portions of the chassis 61, and a guide shaft 66 projected to the side is provided on a forward-and-backward-direction middle portion of the cartridge holder 62. The eject lever 63 is disposed on the outer side of the chassis 61 at the side in which the guide pins 65, 65 and the guide shaft 66 are projected, in parallel to the side surface plate 61b thereof.

Guide apertures 67, 67 linearly extended in the forward and backward direction are provided through the forward-and-backward-direction front and rear portions of the eject lever 63, and a cam aperture 68 is provided through a forward-and-backward-direction middle portion thereof. The guide pins 65, 65 provided on the chassis 61 are slidably pierced through the guide apertures 67, 67, and flange-shaped head portions provided at tip ends of the respective guide pins 65, 65 prevent the eject lever 63 from being detached. The guide shaft 66 provided on the cartridge holder 62 is slidably pierced through the cam aperture 68 of the eject lever 63.

This cam aperture 68 has a horizontal cam portion 68a linearly extended in the forward and backward direction and an inclined cam portion 68b extended continuously from a rear end portion of the horizontal cam portion 68a diagonally downward. As will be described later on, when the guide shaft 66 is positioned at a lower end portion of the inclined cam portion 68b, the cartridge holder 62 is kept in its horizontal state, and when the guide shaft 66 is moved to the horizontal cam portion 68a, the cartridge holder 62 is lifted up at the front side thereof and then inclined.

A tensile coil spring 69 which is an example of a biasing means is stretched between the ejected lever 63 and the chassis 61. The coil spring 69 is stopped by and engaged with an engagement piece 63a provided at the rear end portion of the chassis 61 at its front end, and a spring force of the coil spring 69 constantly biases the eject lever 63 forward. A tip end portion of the eject lever 63 is provided as an eject input portion 63b so as to be projected to the front of the eject lever 63. A button similar to the above-mentioned eject button 24 is fitted to the eject input portion 63b and used for an eject operation of the disk cartridge 50.

The disk loading mechanism 60 having the above arrangement is housed in a facing body having the casing 7, the front panel 8 and the lid body 9 as described above. An operation of the disk loading mechanism 60 housed in the facing body will be described with reference to FIGS. 12 through 14. In order to facilitate contents of the figures, FIGS. 12 through 14 do not show the chassis 61 fixed on the casing 7 but show the cartridge holder 62 and the eject lever 63 which move in respective predetermined manners relative to the chassis 61. The opening and closing operation of the lid body 9 is the same as that described with reference to FIGS. 8(A) to 8(C), 9(A) and 9(B) and hence need not to be described.

Until the disk cartridge 50 is inserted into a predetermined position of the cartridge holder 62 as shown in FIG. 12, the eject lever 63 is located at a rear-side position against the biasing force, and consequently the guide shaft 66 of the cartridge holder 62 is positioned in the horizontal cam portion 68a of the cam aperture 68. Therefore, the front side of the cartridge holder 62 is kept in its lifted state, and in this state, the cartridge holder 62 is held by a holder locking member, not shown.

At this time, a cartridge insertion slot of the cartridge holder 62 is opposed to the opening portion as the recording medium insertion portion opened in accordance with the movement of the lid body 9 in the direction in which the lid body 9 is opened outward. Accordingly, the disk cartridge 50 passed by the opening portion 14a of the disk reproducing apparatus 6 is inserted into the cartridge insertion slot 62e of the cartridge holder 62 as it is and then brought in the disk cartridge loading portion. When the disk cartridge 50 is pushed and inserted into a predetermined position, the ribs 22, 22 of the lid body 9 are brought onto the disk cartridge 50 and the lid body 9 is rotated by the spring force of the torsion spring 23 toward the front panel 8 side, i.e., in the direction in which the opening portion 14a is closed. As a result, the lid body 9 is brought onto the front panel 8, thereby the opening portion 14a being closed.

When the disk cartridge 50 is inserted into the predetermined position of the cartridge holder 62, the locking operation of the holder locking member for locking the cartridge holder 62 is released in accordance with the operation of the disk cartridge 50. As a result, the spring force of the coil spring 69 starts to affect the eject lever 63, and hence the tensile force of the coil spring 69 biases the eject lever 63 forward. Since the guide apertures 67, 67 of the eject lever 63 are slidably engaged with the guide pins 65, 65 of the chassis 61, only the eject lever 63 is moved forward.

Figure 13:
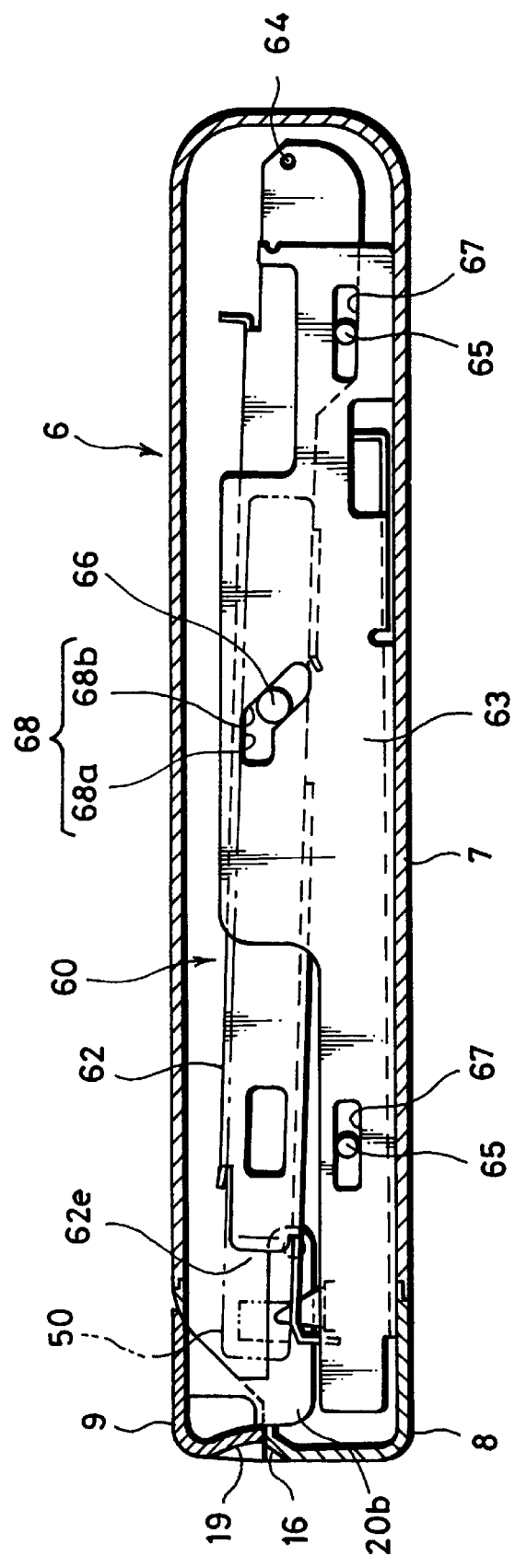
FIG. 13 is a diagram showing the rotation operation of the rotary loading mechanism shown in FIG. 10 and used to explain a state that the inclined angle of the cartridge holder is set large for the state shown in FIG. 12.
Figure 14:
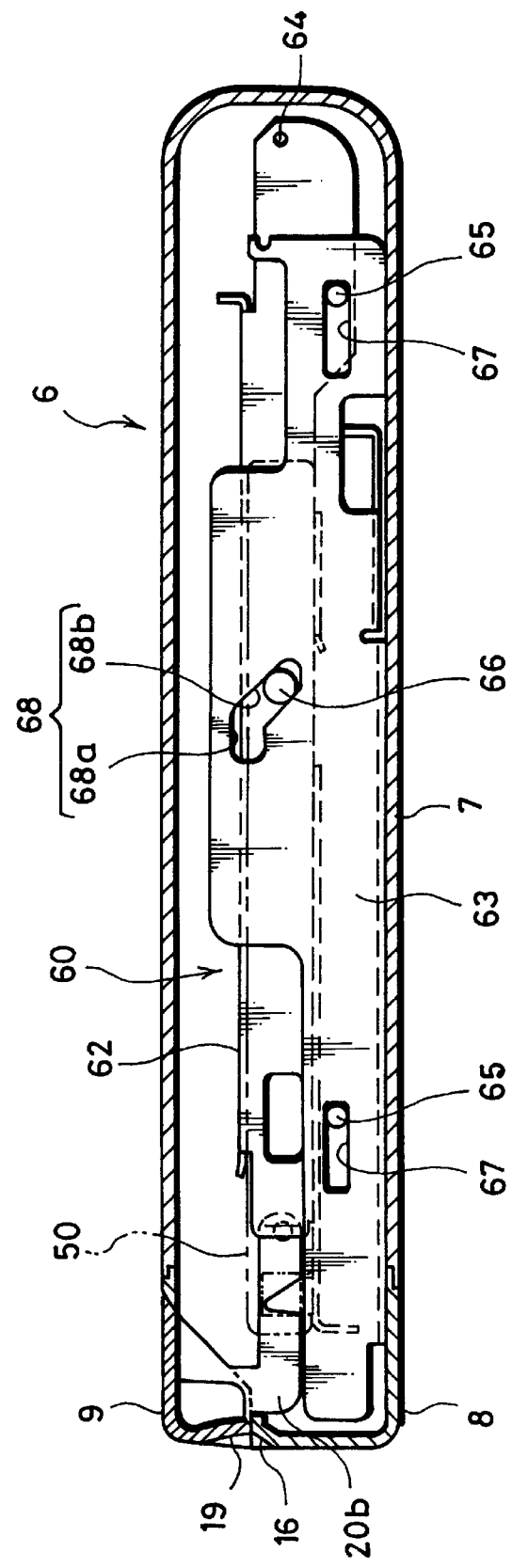
FIG. 14 is a diagram showing the rotation operation of the rotary loading mechanism shown in FIG. 10 and used to explain a state where the cartridge holder is brought from the state shown in FIG. 13 to its horizontal state.

As a result, the cam aperture 68 of the eject lever 63 is relatively moved forward, and consequently the guide shaft 66 positioned in the horizontal cam portion 68a of the cam aperture 68 is moved backward and then brought in the inclined cam portion 68b as shown in FIG. 13. In accordance with this movement of the guide shaft 66, the front side of the cartridge holder 62 is lowered. Further, when the guide shaft 66 reaches the lowermost end portion of the inclined cam portion 68b, as shown in FIG. 14, the front side of the cartridge holder 62 is lowered to its lowermost position, the cartridge holder 62 is brought in its horizontal state.

At this time, the disk cartridge 50 held by the cartridge holder 62 is brought close to the spindle motor 41 of the disk rotating mechanism 40 and then the magneto-optical disk 53 is chucked by the turntable, not shown. As a result, the magnetic head and the optical head are opposed to the magneto-optical disk 53 through the opening porions 54, 54 of the disk cartridge 50, thereafter the operation of recording or reproducing the magneto-optical disk 53 becoming ready.

Figure 15:
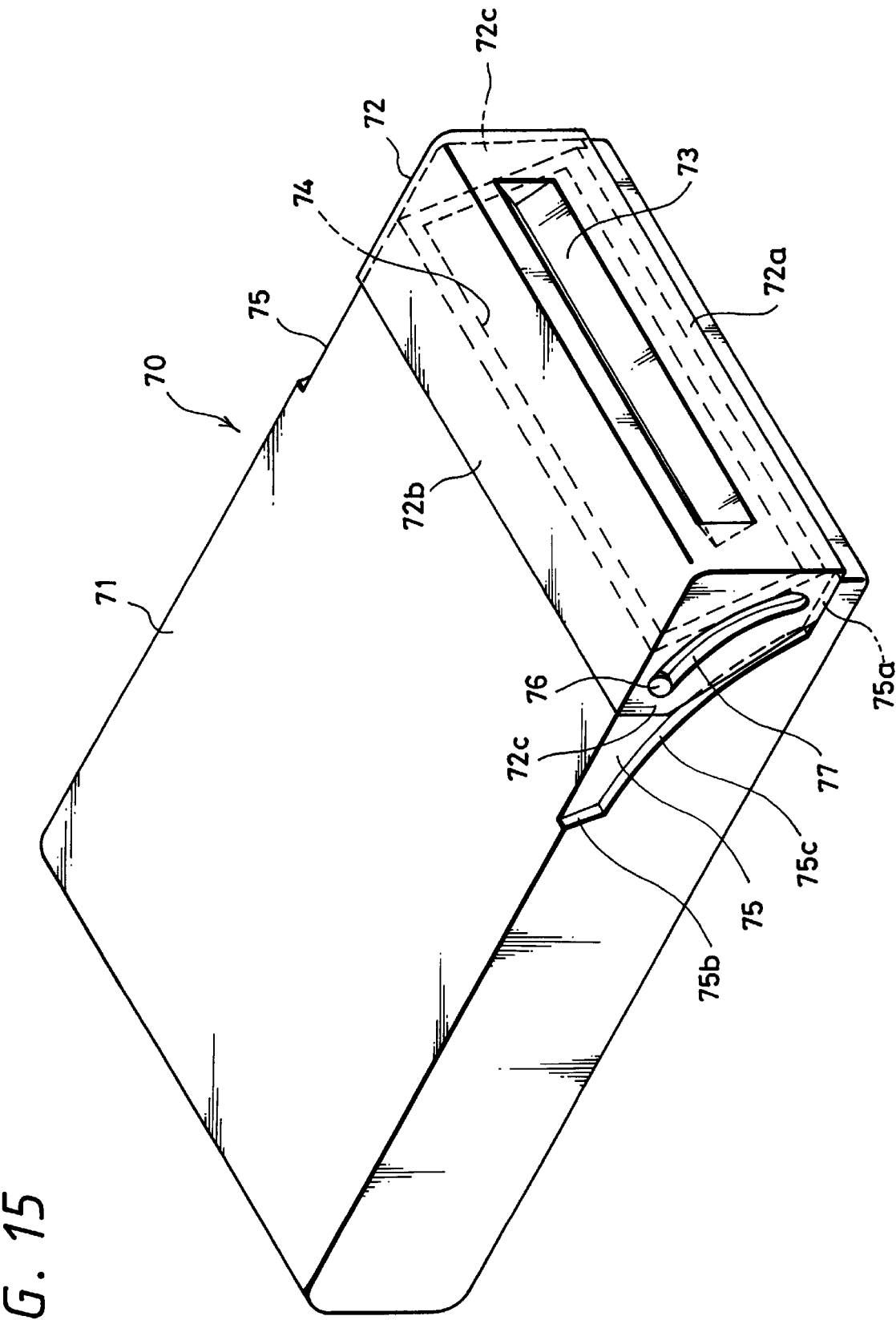
FIG. 15 is a perspective view of an appearance of a disk reproducing apparatus according to a second embodiment of the present invention.

The present invention can also be applied to a disk recording and/or reproducing apparatus 70 having an arrangement shown in FIGS. 15, 16(A) and 16(B). The disk recording and/or reproducing apparatus 70 according to a second embodiment of the present invention has a facing body for housing a disk loading mechanism mounted on a chassis and other mechanisms. The facing body is formed of a casing 71 and a lid body 72. An inclined guide portion 73 is provided only on the lid body 72. The lid body 72 is slidably formed relative to the casing 71 and a sliding movement of the lid body 72 opens and closes a recording medium insertion portion 74 of the casing 72.

The casing 71 is rectangular-box-shaped such that the casing 7 and the front panel 8 of the above first embodiment are formed of one member, and has the recording-medium insertion portion 74, into and from which the disk cartridge 50 is inserted and ejected, by diagonally cutting an upper corner portion on the front side thereof. Concave notch portions 75, 75 for housing side surface plates 72c, 72c of the lid body 72 are provided on both side portions, beside the recording-medium insertion portion 74, of the casing 71.

The lid body 72 has such a shape that the front surface plate 9a of the lid body 9 of the first embodiment is enlarged in the downward direction, and has a front surface plate 72a, an upper surface plate 72b continuously formed from an upper end portion of the front surface plate 72a, and side surface plates 72c, 72c continuously formed from both side portions thereof. An inclined guide portion 73 having a v-shaped cross section projected backward, i.e., a concave-shaped inclined guide portion having a V-shaped cross section is provided on an outer side of the lid body 72, i.e., on its surface opposed to the disk cartridge 50 to be inserted. A left and right direction length of the inclined guide portion 73 is set substantially the same as a lateral-direction length of the disk cartridge 50. When the disk cartridge 50 is inserted, an insertion-side end surface portion of the disk cartridge 50 is brought in contact with an upper surface of the inclined guide portion 73, and an insertion-side lower-surface tip end portion of the disk cartridge 50 is brought in contact with a lower surface of the inclined guide portion 73.

The lid body 72 is fitted to a front end portion of the casing 71 so as to cover the whole recording medium insertion portion 74, and the both end side surface plates 72c, 72c thereof are housed on the left and right concave notch portions 75, 75 of the casing 71. Each of the concave notch portions 75, 75 has a lower restriction surface 75a for being brought in contact with a lower surface of the side surface plate 72c and an upper restriction surface 75b for being brought in contact with a rear surface of the side surface plate 72c. An upward arc-shaped relief surface 75c is formed between the both restriction surfaces 75a, 75b in order to prevent the concave notch portion 75 from being brought in contact with the side surface plate 72c. A guide convex portion 76 projected in the side direction is provided in the vicinity of the recording insertion portion 74 on the upper side of each of the concave notch portions 75, 75.

An arc-shaped guide aperture 77 with which the guide convex portion 77 is slidably engaged is provided through each of the side surface plates 72c, 72c of the lid body 72 so as to correspond to the guide convex portion 76. The guide aperture 77 sets a range within which the lid body 72 can be moved. As shown in FIGS. 15 and 16(A), when the lid body 72 closes the recording medium insertion portion 74, the guide convex portion 76 is positioned at an upper end edge of the guide aperture 77. When the lid body 72 is lifted and then the recording medium insertion portion 74 is opened, the guide convex portion 76 is positioned at a lower end edge of the guide aperture 77.

An opening and closing operation of the lid body 72 according to the second embodiment having the above arrangement will be described. An insertion side of the disk cartridge 50 to be inserted into the disk recording and/or reproducing apparatus 70 is brought close to the inclined guide portion 73 of the lid body 72 and then inserted thereinto from the diagonally downward direction , and then a pressing force is applied to the disk cartridge 50 in the diagonally backward direction. At this time, the lid body 72 is guided by the guide convex portion 76 slidably engaged with the guide aperture 77 and gradually raised thereby. The lid body 72 is positionally changed from a state shown by a broken line in FIG. 16(A) through a state shown by one-dot chain line to a state shown by a two-dot chain line. Then, the recording medium insertion portion 74 is opened, and it becomes possible to insert the disk cartridge 50 into the cartridge holder 31.

When the disk cartridge 50 is completely inserted into the cartridge holder 31 and then a rear end portion of the disk cartridge 50 is inserted beyond a lower end edge of the front surface plate 72a of the lid body 72, nothing supports a front side of the front surface plate 72a thereof but a rear side thereof is supported by an upper surface of the casing 71. As a result, the front surface plate 72a side of the lid body is rotated downward due to its weight. This rotation of the lid body 72 automatically closes the recording medium insertion point 74. The lid body 72 may be constantly biased in the direction in which it is closed by a spring force of a spring provided between the casing 71 and the lid body 72.

Having described above, the present invention is not limited to each of the above embodiments. While in the above embodiments the magneto-optical disk housed in the disk cartridge is employed as the recording medium, it is needless to say that a disk-shaped recording medium such as other recordable optical disk, a read-only optical disk, a magnetic disk or the like can be employed as the recording medium and the present invention can be applied to a recording medium such as a cassette housing a magnetic tape, a card-shaped medium having a semiconductor memory sealed therein or the like. While in the above embodiments the present invention is applied to the disk reproducing apparatus, the present invention can be applied to a recording and/or reproducing apparatus as well as a recording or storage apparatus dedicated for the recording or the storage.

While in the first embodiment the inclined guide portions 16, 19 are provided as an inclined guide portion used for moving a lid body toward a portion of a casing where the casing is opened to the outside so that the front panel 8 as a casing-side member and the lid body 9 are continuously connected to each other in the vicinity of the contact boundary therebetween and while in the second embodiment the inclined guide portion 73 is provided as such inclined guide portion used for the movement only on the lid body 72, the inclined guide portion may be only on a lid-body-side or casing-side member or the lid body may open and close the whole opening portion of the casing body. While in the first embodiment the inclined guide portion 19 of the lid body 9 is formed as a curved surface and the inclined guide portion 16 of the casing body 7 is formed as a plane, contrary the inclined guide portion 19 and the inclined guide portion 16 may be formed as a plane and a curved surface, respectively, or both inclined portions 16, 19 may be formed as a curved surface and a plane.

While in the above embodiments the disk cartridge 50 is used to rotate the lid bodies 9, 72, it is needless to say that the present invention is not limited thereto and an operation can directly open the lid bodies 9 and 72 by hand. While in the above embodiments the torsion spring 23 is employed as a springy means of the lid body moving mechanism, it is needless to say that the present invention is not limited thereto and a spring member such as a rubber elastic body or the like as well as other springy member such as a coil spring or a plate spring may be employed.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An electronic equipment employing a storage medium, comprising:
   a main body having on its front surface side an opening portion used for insertion and/or ejection of a storage medium; and
   a lid body rotatably provided on said main body, said lid body opening and closing said opening portion and said lid body having an inclined portion having a curved surface and used for rotating said lid body in a direction in which said storage medium opens said opening portion when said storage medium is inserted into said electronic equipment, wherein said curved surface is exposed to an exterior of said main body and wherein said inclined portion is formed so as to have a shape which permits generation of a force for rotating said lid body by said storage medium in the direction in which said opening portion is opened when a storage medium is inserted into said electronic equipment, wherein said inclined portion is formed on said lid body so as to be inclined in the direction in which a thickness thereof is gradually reduced toward its end in contact with a peripheral portion of said opening portion, and wherein said main body has a shape of a substantially rectangular parallelepiped, wherein said lid body has a first surface portion forming a substantially same plane as an upper surface of said main body when said opening portion is closed, and a second surface portion provided substantially perpendicular to said first surface portion and forming a substantially same surface as a side surface of said main body, and wherein a lower-side peripheral portion of said opening portion of said main body and a tip end portion of said second surface portion of said lid body are brought in contact with each other to close said opening portion.

2. An electronic equipment employing a storage medium according to claim 1, wherein said inclined portion is a surface of said lid body which is opposed to a storage medium to be inserted into said electronic equipment and which is provided on said tip end portion of said second surface portion.

3. An electronic equipment employing a storage medium according to claim 1, wherein said inclined portion is a surface of said lid body which is opposed to a storage medium to be inserted into said electronic equipment and which is provided on a front surface portion of said second surface portion so as to form a part of a substantially V-shaped concave portion.

4. An electronic equipment employing a storage medium according to claim 3, wherein said main body is further provided with a restriction portion for restricting a rotation amount of said lid body.

5. An electronic equipment employing a storage medium according to claim 1, wherein said opening portion is formed by diagonally notching one of four corners of said main body.

6. An electronic equipment employing a storage medium according to claim 5, wherein a side edge of said opening portion has a first portion linearly extended upward from a lower side of said opening portion and a second arc-shaped portion continuously formed from said first portion.

7. A recording medium recording and/or reproducing apparatus, comprising:
   an apparatus body having an opening portion used for insertion and/or ejection of a recording medium, said apparatus body having a recording and/or reproducing unit for recording or reproducing a recording medium inserted through said opening portion; and
   a lid body for opening and closing said opening portion, said lid body rotably provided on said apparatus body and said lid body having on its side surface an inclined portion having a curved surface and used for rotating said lid body in a direction in which said recording medium opens said opening portion when said storage medium is inserted into said apparatus body, wherein said curved surface is exposed to an exterior of said apparatus body,
   wherein said apparatus body has a shape of a substantially rectangular parallelepiped,
   wherein said lid body has a first surface portion forming a substantially same plane as an upper surtace of said apparatus body when said opening portion is closed, and a second surface portion provided substantially perpendicular to said first surface portion and forming a substantially same surface as a side surface of said apparatus body, and wherein a lower-side peripheral portion of said opening portion of said apparatus body and a tip end portion of said second surface portion of said lid body is brought in contact with each other to close said opening portion.

8. A recording medium recording and/or reproducing apparatus according to claim 7, wherein said inclined portion is a surface of said lid body which is opposed to a recording medium to be inserted into said apparatus and which is provided on said tip end portion of said second surface portion.

9. A recording medium recording and/or reproducing apparatus according to claim 7, wherein said inclined portion is a surface of said lid body which is opposed to a recording medium to be inserted into said apparatus and which is provided on a front surface portion of said second surface portion so as to form a part of a substantially V-shaped concave portion.

10. A recording medium recording and/or reproducing apparatus according to claim 9, wherein said apparatus body is further provided with a restriction portion for restricting a rotation amount of said lid body.

11. A recording medium recording and/or reproducing apparatus according to claim 7, wherein said opening portion is formed by diagonally notching one of four corners of said main body.

12. A recording medium recording and/or reproducing apparatus according to claim 11, wherein a side edge of said opening portion has a first portion linearly extended upward from a lower side of said opening portion and a second arc-shaped portion continuously formed from said first portion.

13. A recording and/or reproducing apparatus using a disk cartridge, comprising:

a main body formed so as to have a shape of a substantially rectangular parallelepiped, said main body having an opening used for insertion and/or ejection of a disk cartridge by diagonally notching one of four corners thereof, and said main body having on a lower end edge of said opening portion a first inclined surface portion inclined upward from a lower side of said opening portion thereof and also having at its side edge of said opening portion a first portion linearly extended upward from a lower side of said opening portion and an arc-shaped second portion formed continuously from said first portion; and a lid body rotatably provided on said main body, said lid body having a first surface portion forming a substantially same plane as an upper surface of said apparatus body when said opening portion is closed, and a second surface portion provided substantially perpendicular to said first surface portion and forming a substantially same surface as a side surface of said main body, said lid body having a second inclined surface which forms a substantial V-shaped concave portion together with said first inclined surface, which is provided at a portion, in contact with a lower end edge of said opening portion, of said second surface portion, and which is operated by said disk cartridge inserted into said apparatus to rotate said lid body in cooperation with said inclined surface in the direction in which said opening portion is opened.

14. A recording and/or reproducing apparatus using a disk cartridge, comprising:

a main body formed so as to have a shape of a substantially rectangular parallelepiped, said main body having an opening used for insertion and/or ejection of a disk cartridge by diagonally notching one of four corners thereof and having a rotation restriction portion formed on a side edge of said opening portion thereof; and a lid body provided on said main body so that it can be moved and rotated by a disk cartridge to be inserted, said lid body having a first surface portion forming a substantially same plane as an upper surface of said apparatus body when said opening portion is closed, and a second surface portion which is provided substantially perpendicular to said first surface portion and forming a substantially same surface as a side surface of said main body and has a concave portion having a substantially V-shaped cross section that is operated by a disk cartridge to be inserted into said apparatus and that serves to rotate said lid body in a direction in which said opening portion is opened.

15. An electronic equipment employing a storage medium, comprising:

a main body having on its front surface side an opening portion used for insertion and/or ejection of a storage medium; and a lid body rotatably provided on said main body, said lid body opening and closing said opening portion and said lid body having an inclined portion used for rotating said lid body in a direction in which said storage medium opens said opening portion when said storage medium is inserted into said electronic equipment, wherein said inclined portion being formed so as to have a shape which permits generation of a force for rotating said lid body by said storage medium in the direction in which said opening portion is opened when a storage medium is inserted into said electronic equipment and wherein said inclined portion is formed on said lid body so as to be inclined in the direction in which a thickness thereof is gradually reduced toward its end in contact with a peripheral portion of said opening portion;

wherein said main body has a shape of a substantially rectangular parallelepiped, wherein said lid body has a first surface portion forming a substantially same plane as an upper surface of said main body when said opening portion is closed, and a second surface portion provided substantially perpendicular to said first surface portion and forming a substantially same surface as a side surface of said main body, and wherein a lower-side peripheral portion of said opening portion of said main body and a tip end portion of said second surface portion of said lid body are brought in contact with each other to close said opening portion.

16. An electronic equipment employing a storage medium according to claim 15, wherein said inclined portion is a surface of said lid body which is opposed to a storage medium to be inserted into said electronic equipment and which is provided on said tip end portion of said second surface portion.

17. An electronic equipment employing a storage medium according to claim 15, wherein said inclined portion is a surface of said lid body which is opposed to a storage medium to be inserted into said electronic equipment and which is provided on a front surface portion of said second surface portion so as to form a part of a substantially V-shaped concave portion.

18. An electronic equipment employing a storage medium according to claim 17, wherein said main body is further provided with a restriction portion for restricting a rotation amount of said lid body.

19. An electronic equipment employing a storage medium according to claim 15, wherein said opening portion is formed by diagonally notching one of four corners of said main body.

20. An electronic equipment employing a storage medium according to claim 19, wherein a side edge of said opening portion has a first portion linearly extended upward from a lower side of said opening portion and a second arc-shaped portion continuously formed from said first portion.

21. A recording medium recording and/or reproducing apparatus, comprising:

an apparatus body having an opening portion used for insertion and/or ejection of a recording medium, said apparatus body having a recording and/or reproducing unit for recording or reproducing a recording medium inserted through said opening portion; and a lid body for opening and closing said opening portion, said lid body rotatably provided on said apparatus body and said lid body having on its side surface an inclined portion used for rotating said lid body in a direction in which said recording medium opens said opening portion when said storage medium is inserted into said apparatus body;

wherein said apparatus body has a shape of a substantially rectangular parallelepiped, wherein said lid body has a first surface portion forming a substantially same plane as an upper surface of said apparatus body when said opening portion is closed, and a second surface portion provided substantially perpendicular to said first surface portion and forming a substantially same surface as a side surface of said apparatus body, and wherein a lower-side peripheral portion of said opening portion of said apparatus body and a tip end portion of said second surface portion of said lid body are brought in contact with each other to close said opening portion.

22. A recording medium recording and/or reproducing apparatus according to claim 21, wherein said inclined portion is a surface of said lid body which is opposed to a recording medium to be inserted into said apparatus and which is provided on said tip end portion of said second surface portion.

23. A recording medium recording and/or reproducing apparatus according to claim 21, wherein said inclined portion is a surface of said lid body which is opposed to a recording medium to be inserted into said apparatus and which is provided on a front surface portion of said second surface portion so as to form a part of a substantially V-shaped concave portion.

24. A recording medium recording and/or reproducing apparatus according to claim 23, wherein said apparatus body is further provided with a restriction portion for restricting a rotation amount of said lid body.

25. A recording medium recording and/or reproducing apparatus according to claim 21, wherein said opening portion is formed by diagonally notching one of four corners of said main body.

26. A recording medium recording and/or reproducing apparatus according to claim 25, wherein a side edge of said opening portion has a first portion linearly extended upward from a lower side of said opening portion and a second arc-shaped portion continuously formed from said first portion.

* * * * *